US012577153B2

(12) United States Patent
Oishi et al.

(10) Patent No.: US 12,577,153 B2
(45) Date of Patent: Mar. 17, 2026

(54) COATING DEVICE HAVING FIRST AND SECOND TEMPERATURE CONTROLLED FLOW PATHS FOR COATING A GLASS FIBER AND COATING METHOD

(71) Applicant: SUMITOMO ELECTRIC INDUSTRIES, LTD., Osaka (JP)

(72) Inventors: Kazumasa Oishi, Osaka (JP); Satoshi Yoshikawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 205 days.

(21) Appl. No.: 17/851,204

(22) Filed: Jun. 28, 2022

(65) Prior Publication Data

US 2023/0002274 A1 Jan. 5, 2023

(30) Foreign Application Priority Data

Jul. 5, 2021 (JP) ................................. 2021-111389

(51) Int. Cl.
*C03C 25/18* (2006.01)
*B05C 3/12* (2006.01)
(Continued)

(52) U.S. Cl.
CPC .............. *C03C 25/18* (2013.01); *B05C 3/125* (2013.01); *B05C 3/172* (2013.01); *B29C 48/34* (2019.02);
(Continued)

(58) Field of Classification Search
CPC ..... C03C 25/12; C03C 25/1065; B29C 48/15;

B29C 48/1554; B29C 48/16; B29C 48/19;
B29C 48/21; B29C 48/34; B29C 48/345;
B29C 48/335; B29C 48/78; B29C 48/865;
B29C 48/154; B29C 48/695; B29C
48/705; B29C 48/70
(Continued)

(56) References Cited

U.S. PATENT DOCUMENTS 545,246 A * 8/1895 McCurdy ................ C03C 25/47
65/435
3,503,823 A * 3/1970 Richart ................... B29C 48/34
118/620
(Continued)

FOREIGN PATENT DOCUMENTS

JP 2019-099392 A 6/2019

*Primary Examiner* — Karl Kurple
(74) *Attorney, Agent, or Firm* — Faegre Drinker Biddle & Reath LLP

(57) ABSTRACT

A coating device includes: a fiber passage through which a glass fiber passes downward in a vertical direction; a first flow path which is a flow path allowing a primary resin to flow toward the fiber passage and includes a first branch path horizontally dividing the primary resin moving in a horizontal direction; a first temperature controller which is disposed along the first flow path and controls a temperature of the first flow path; a second flow path which is a flow path allowing a secondary resin to flow toward the fiber passage, includes a second branch path horizontally dividing the secondary resin moving in the horizontal direction, and is located below the first flow path; and a second temperature controller which is disposed along the second flow path and controls a temperature of the second flow path.

9 Claims, 4 Drawing Sheets

(51) Int. Cl.

| | | |
|---|---|---|
| *B05C 3/172* | (2006.01) | |
| *B29C 48/34* | (2019.01) | |
| *C03C 25/105* | (2018.01) | |
| *C03C 25/12* | (2006.01) | |
| *G02B 6/02* | (2006.01) | |

(52) U.S. Cl.

CPC ............ *C03C 25/105* (2013.01); *C03C 25/12* (2013.01); *G02B 6/02395* (2013.01); *Y10S 118/18* (2013.01)

(58) Field of Classification Search

USPC ...................................... 425/113, 133.1, 462

See application file for complete search history.

(56) References Cited

U.S. PATENT DOCUMENTS

| | | | | |
|---|---|---|---|---|
| 3,903,233 | A * | 9/1975 | Dougherty ............ | B29C 48/304 264/45.9 |
| 4,203,715 | A * | 5/1980 | Raley ...................... | B29C 48/49 264/171.27 |
| 4,374,161 | A * | 2/1983 | Geyling .................. | B29C 48/05 427/407.1 |
| 4,395,221 | A * | 7/1983 | Herrington ............. | B29C 48/21 425/467 |
| 4,451,224 | A * | 5/1984 | Harding .............. | B29C 45/2725 425/572 |
| 4,510,884 | A * | 4/1985 | Rosebrooks ............ | C03C 25/18 118/420 |
| 4,531,959 | A * | 7/1985 | Kar ......................... | C03C 25/18 65/528 |
| 5,160,541 | A * | 11/1992 | Fickling .................. | B29C 48/05 118/420 |
| 5,366,527 | A * | 11/1994 | Amos et al. ............ | C03C 25/47 65/382 |
| 5,449,408 | A * | 9/1995 | Koaizawa ............... | C03C 25/12 118/420 |
| 5,976,253 | A * | 11/1999 | Rosenkranz ............ | C03C 25/18 118/119 |
| 6,030,658 | A * | 2/2000 | Tsuchiya ................. | C03C 25/18 118/420 |
| 6,077,470 | A * | 6/2000 | Beaumont ........... | B29C 45/2701 425/572 |
| 6,173,102 | B1 * | 1/2001 | Suzuki ............... | G02B 6/02395 385/128 |
| 6,387,179 | B1 * | 5/2002 | Anderson ............. | B29B 15/122 118/411 |
| 6,478,564 | B1 * | 11/2002 | Tieu ........................ | B29C 48/92 425/464 |
| 6,491,510 | B1 * | 12/2002 | Tieu ...................... | B29C 48/705 425/464 |
| 6,503,438 | B2 * | 1/2003 | Beaumont .............. | B29C 48/09 425/572 |
| 6,576,058 | B2 * | 6/2003 | Oishi ...................... | C03C 25/12 118/411 |
| 7,320,589 | B2 * | 1/2008 | Babin ..................... | B29C 45/30 425/572 |
| 8,241,032 | B2 * | 8/2012 | Klobucar ............ | B29C 45/2725 425/572 |
| 8,568,133 | B2 * | 10/2013 | Kaushal .................. | B29C 45/74 425/572 |
| 12,012,358 | B2 * | 6/2024 | Biddix .................... | B05C 3/172 |
| 2002/0000685 | A1 * | 1/2002 | Beaumont ............ | B29C 48/345 264/328.12 |
| 2002/0179008 | A1 * | 12/2002 | Oishi .................. | C03C 25/1065 118/412 |
| 2004/0188876 | A1 * | 9/2004 | Baumann ............. | H01B 13/144 264/171.15 |
| 2005/0153067 | A1 * | 7/2005 | Barker .................... | C03C 25/47 118/308 |
| 2014/0044906 | A1 * | 2/2014 | Dooley .............. | B29C 48/3363 428/36.91 |
| 2015/0123303 | A1 * | 5/2015 | Tornow ................. | B29C 48/865 264/45.7 |
| 2018/0304304 | A1 * | 10/2018 | Moore .................... | B05D 3/06 |

* cited by examiner

COATING DEVICE HAVING FIRST AND SECOND TEMPERATURE CONTROLLED FLOW PATHS FOR COATING A GLASS FIBER AND COATING METHOD

TECHNICAL FIELD

The present disclosure relates to a coating device and a coating method.

The present application claims priority from Japanese Patent Application No. 2021-111389 filed on Jul. 5, 2021, which is based on the contents and all of which are incorporated herein by reference in their entirety.

BACKGROUND

Japanese Unexamined Patent Publication No. 2019-99392 discloses a resin coating device. This device includes a first die which coats the outside of a drawn glass fiber with a primary resin and a second die which coats the outside of the primary resin with a secondary resin. The first die and the second die are integrally assembled and the primary resin and the secondary resin collectively coat the glass fiber. Further, this device includes a first fluid circulation unit and a second fluid circulation unit. The first fluid circulation unit is provided in the periphery of the first die and controls the temperature of the circulating fluid to control the temperature of the primary resin supplied to the first die. The second fluid circulation unit is provided in the periphery of the second die and controls the temperature of the circulating fluid to control the temperature of the secondary resin supplied to the second die.

SUMMARY

A coating device according to an embodiment of the present disclosure includes: a fiber passage through which a glass fiber passes downward in a vertical direction; a first flow path which is a flow path allowing a primary resin to flow toward the fiber passage and includes a first branch path horizontally dividing the primary resin moving in a horizontal direction; a first temperature controller which is disposed along the first flow path and controls a temperature of the first flow path; a second flow path which is a flow path allowing a secondary resin to flow toward the fiber passage, includes a second branch path horizontally dividing the secondary resin moving in the horizontal direction, and is located below the first flow path; and a second temperature controller which is disposed along the second flow path and controls a temperature of the second flow path.

DETAILED DESCRIPTION

Figure 1:
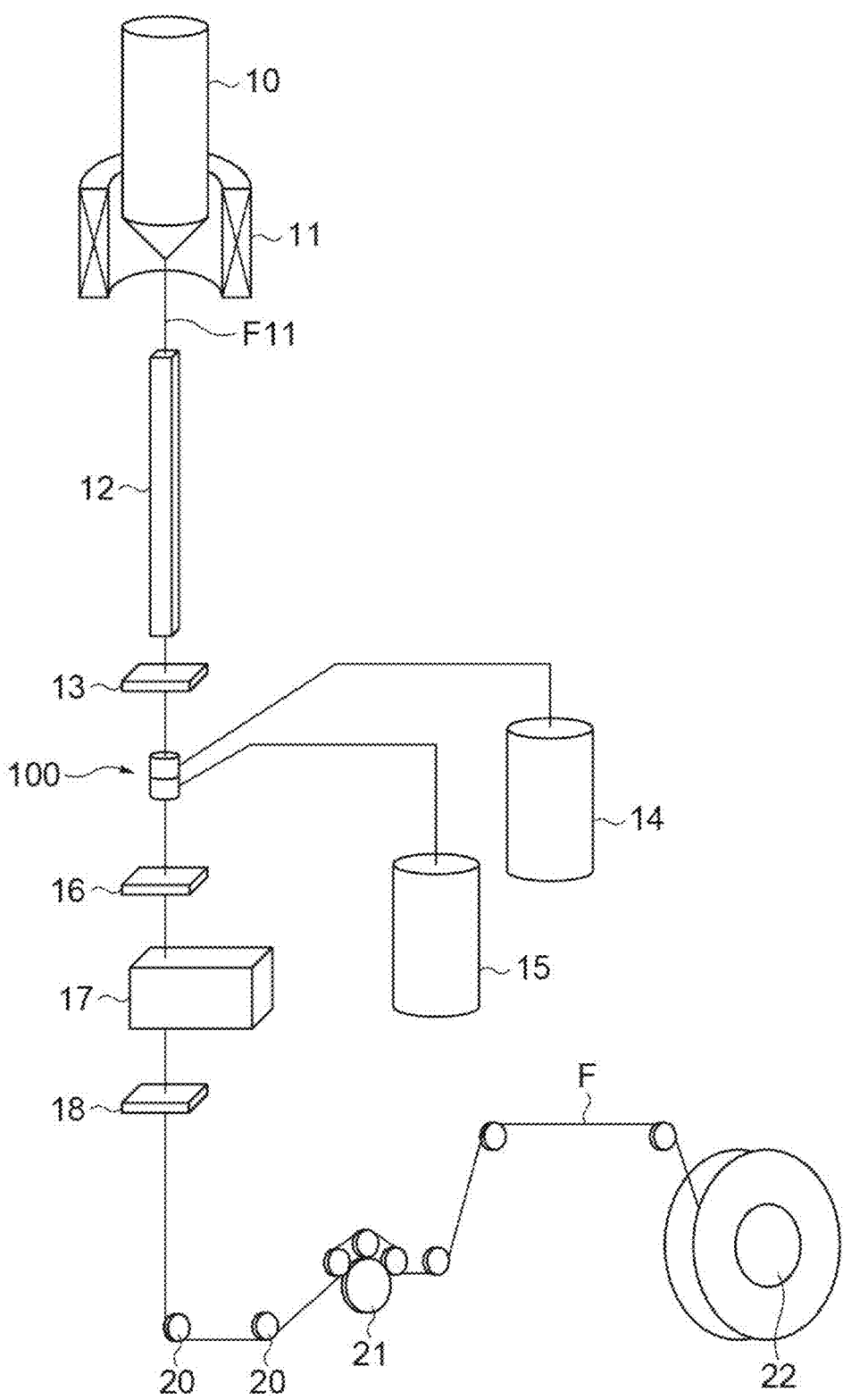
FIG. 1 is a diagram showing a configuration of an optical fiber manufacturing apparatus according to an example.

In the technique related to the resin coating device, it is desirable that the flow of the resin for coating the glass fiber is uniformly adjusted in the circumferential direction of the glass fiber. Further, in the technique, it is desired to decrease the size of the device in the vertical direction.

According to the coating device of the present disclosure, it is possible to uniformly adjust the flow of the resin for coating the glass fiber in the circumferential direction of the glass fiber and to decrease the size of the device in the vertical direction.

Description of Embodiment of Present Disclosure

First, the contents of the embodiment of the present disclosure will be described. A coating device according to an embodiment of the present disclosure includes: a fiber passage through which a glass fiber passes downward in a vertical direction; a first flow path which is a flow path allowing a primary resin to flow toward the fiber passage and includes a first branch path horizontally dividing the primary resin moving in a horizontal direction; a first temperature controller which is disposed along the first flow path and controls a temperature of the first flow path; a second flow path which is a flow path allowing a secondary resin to flow toward the fiber passage, includes a second branch path horizontally dividing the secondary resin moving in the horizontal direction, and is located below the first flow path; and a second temperature controller which is disposed along the second flow path and controls a temperature of the second flow path.

In the coating device, the glass fiber passing through the fiber passage is coated with the primary resin flowing through the first flow path and subjected to the temperature control by the first temperature controller. Further, the glass fiber coated with the primary resin is further coated with the secondary resin flowing through the second flow path and subjected to the temperature control by the second temperature controller. The first flow path and the second flow path are respectively provided with the first branch path and the second branch path which horizontally divide the resin. Therefore, it is possible to form the flow path directed from a plurality of positions in the circumferential direction toward the fiber passage. Thus, it is possible to uniformly adjust the flow of the resin used for coating the glass fiber in the circumferential direction of the glass fiber. Further, since the branch path branches only in the horizontal direction, it is possible to decrease the size of the device in the vertical direction.

The first flow path and the first temperature controller as an example may form a first annular body disposed around the fiber passage and having an annular shape. The second flow path and the second temperature controller may form a second annular body disposed around the fiber passage, disposed below the first annular body, and having an annular shape. In this configuration, the flow paths and the temperature controllers can be evenly arranged around the fiber passage.

A heat shield layer may be formed between the first annular body and the second annular body in the vertical direction. In this configuration, the influence of the heat of the first temperature controller on the second annular body and the influence of the heat of the second temperature controller on the first annular body are suppressed.

The first flow path and the second flow path may be located between the first temperature controller and the second temperature controller in the vertical direction, the temperature of the first flow path may be adjusted by the first temperature controller, and the temperature of the second flow path may be adjusted by the second temperature controller. In this configuration, the influence of the heat of the first temperature controller on the second annular body and the influence of the heat of the second temperature controller on the first annular body are suppressed.

A heat source of the first temperature controller may be a heat generator disposed along the first flow path, and a heat source of the second temperature controller may be a third flow path which is disposed along the second flow path and through which a fluid having a controlled temperature flows. In this configuration, for example, the primary resin flowing through the first flow path can be easily adjusted to a temperature higher than that of the secondary resin.

The first branch path may include one inlet and two outlets and a cross-sectional area of each of the two outlets may be a half of a cross-sectional area of the one inlet. In this configuration, the primary resin can be evenly divided by the first branch path.

The first branch path may include one inlet and a plurality of outlets and a cross-sectional area of the one inlet may be the same as the sum of cross-sectional areas of the plurality of outlets. In this configuration, the primary resin can be evenly divided by the first branch path.

The first flow path may include four outlets divided by the first branch path, and the four outlets may be evenly arranged around the fiber passage in a circumferential direction. In this configuration, the flow of the primary resin in the vicinity of the fiber passage is likely to be uniform in the circumferential direction. Additionally, the "uniform in the circumferential direction" includes not only the case in which the intervals are strictly equal, but also the case in which the intervals are substantially equal.

The second branch path may include one inlet and two outlets and a cross-sectional area of each of the two outlets may be a half of a cross-sectional area of the one inlet. In this configuration, the secondary resin can be evenly divided by the second branch path.

The second branch path may include one inlet and a plurality of outlets and a cross-sectional area of the one inlet may be the same as the sum of cross-sectional areas of the plurality of outlets. In this configuration, the secondary resin can be evenly divided by the second branch path.

The second flow path may include four outlets divided by the second branch path, and the four outlets may be evenly arranged in the circumferential direction around the fiber passage. In this configuration, the flow of the secondary resin in the vicinity of the fiber passage is likely to be uniform in the circumferential direction. Additionally, also in this case, the "uniform in the circumferential direction" includes not only the case in which the intervals are strictly equal, but also the case in which the intervals are substantially equal.

A coating method according to an embodiment includes: passing the glass fiber through a fiber passage downward in a vertical direction; controlling a temperature of a primary resin flowing through a first flow path branching horizontally by a first temperature controller to control the temperature of the primary resin to a first temperature; controlling a temperature of a secondary resin flowing through a second flow path located below the first flow path and branching horizontally by a second temperature controller to control a temperature of the secondary resin to a second temperature; coating the glass fiber moving through the fiber passage with the primary resin flowing through the first flow path; and coating the glass fiber moving through the fiber passage and coated with the primary resin with the secondary resin flowing through the second flow path.

In the coating method, the glass fiber passing through the fiber passage is coated with the primary resin flowing through the first flow path and controlled to the first temperature. Further, the glass fiber coated with the primary resin is further coated with the secondary resin flowing through the second flow path and controlled to the second temperature. Since the resin is divided in the first flow path and the second flow path, it is possible to form a flow path from a plurality of positions in the circumferential direction toward the fiber passage. Thus, it is possible to uniformly adjust the flow of the resin used for coating the glass fiber in the circumferential direction of the glass fiber. Further, since the resin is divided only in the horizontal direction, it is possible to decrease the size of the device in the vertical direction.

Detail of Embodiment of Present Disclosure

Detailed examples of the coating device according to the present disclosure will be described below with reference to the drawings. The coating device is a device which manufactures an optical fiber in which a surface of a glass fiber is coated with a resin, may mean an entire optical fiber manufacturing apparatus, or may mean a part of the optical fiber manufacturing apparatus. Additionally, the present disclosure is not limited to these examples, is indicated by the scope of claims, and is intended to include all modifications within the meaning and scope equivalent to the scope of claims. In the following description, the same elements will be designated by the same reference numerals in the description of the drawings, and duplicate description will be omitted.

FIG. 1 shows a configuration of an optical fiber manufacturing apparatus 1 as an example. As shown in FIG. 1, the optical fiber manufacturing apparatus 1 is an apparatus for manufacturing an optical fiber F having a glass fiber F11 including a core and a clad and a coating resin and has a configuration in which a drawing furnace 11, a forced cooling device 12, an outer diameter measuring device 13, a resin coating device 100, an uneven thickness measuring device 16, a UV furnace 17, an outer diameter measuring device 18, a guide roller 20, a capstan 21, and a winding bobbin 22 are provided in order along the passage path of the glass fiber F11 and the optical fiber F.

In the optical fiber manufacturing apparatus 1, the initial moving direction of the optical fiber F is set to the vertical direction and the moving direction of the optical fiber F is set to the horizontal direction or an inclined direction at the rear stage of the guide roller 20. The drawing furnace 11 draws a preform (glass base material) 10 containing quartz glass as a main component to form the glass fiber F11 including a core and a clad. The drawing furnace 11 includes heaters which are arranged with the preform 10 set inside the drawing furnace 11 interposed therebetween. The heaters may surround the preform 10. The end portion of the preform 10 is melted by the heating of the heaters and drawn to form the glass fiber F11. The drawn glass fiber F11 moves downward along the vertical direction.

The forced cooling device 12 cools the drawn glass fiber F11. The forced cooling device 12 has a sufficient length along the vertical direction in order to sufficiently cool the glass fiber F11. The forced cooling device 12 includes, for example, an intake port and an exhaust port (not shown) in order to cool the glass fiber F11 and cools the glass fiber F11 by introducing a cooling gas from the intake port.

The outer diameter measuring device 13 measures the outer diameter of the cooled glass fiber F11. For example, the outer diameter measuring device 13 measures the outer diameter of the glass fiber F11 by irradiating the glass fiber F11 with light and taking an image of the light having passed through the glass fiber F11.

The resin coating device 100 coats the glass fiber F11 with a resin. The resin coating device 100 holds two types of liquid resins that are cured by ultraviolet rays. In the resin coating device 100, the glass fiber F11 passes through the held resin so that an inner layer resin (primary resin 14) and an outer layer resin (secondary resin 15) coat the surface of the glass fiber F11 in order. The details of the resin coating device 100 will be described later.

The uneven thickness measuring device 16 measures the deviation of the center position of the glass fiber F11 with respect to the center position of the optical fiber F. In other words, the uneven thickness measuring device 16 measures the unevenness of the inner layer resin and the outer layer resin coated on the glass fiber F11 and the peripheral surface thereof. For example, the uneven thickness measuring device 16 measures the center deviation by irradiating the optical fiber F with light and taking an image of the light having passed through the optical fiber F.

The UV furnace 17 is a resin curing portion which irradiates two kinds of resins (a primary resin 14 and a secondary resin 15) coated on the surface of the glass fiber F11 with ultraviolet rays to cure the resins. When the glass fiber F11 of which the surface is coated with two kinds of resins 14 and 15 passes through the UV furnace 17, the optical fiber F having the glass fiber F11 and two coating layers is formed.

The outer diameter measuring device 18 measures the outer diameter of the optical fiber F in which the glass fiber F11 is coated with the resin. The outer diameter measuring method is the same as that of the outer diameter measuring device 13.

The guide roller 20 guides the optical fiber F so that the optical fiber F moves along a predetermined direction. After the moving direction of the optical fiber F is changed by the guide roller 20, the optical fiber is taken up by the capstan 21 and is sent to the winding bobbin 22. The winding bobbin 22 winds the completed optical fiber F.

Figure 2:
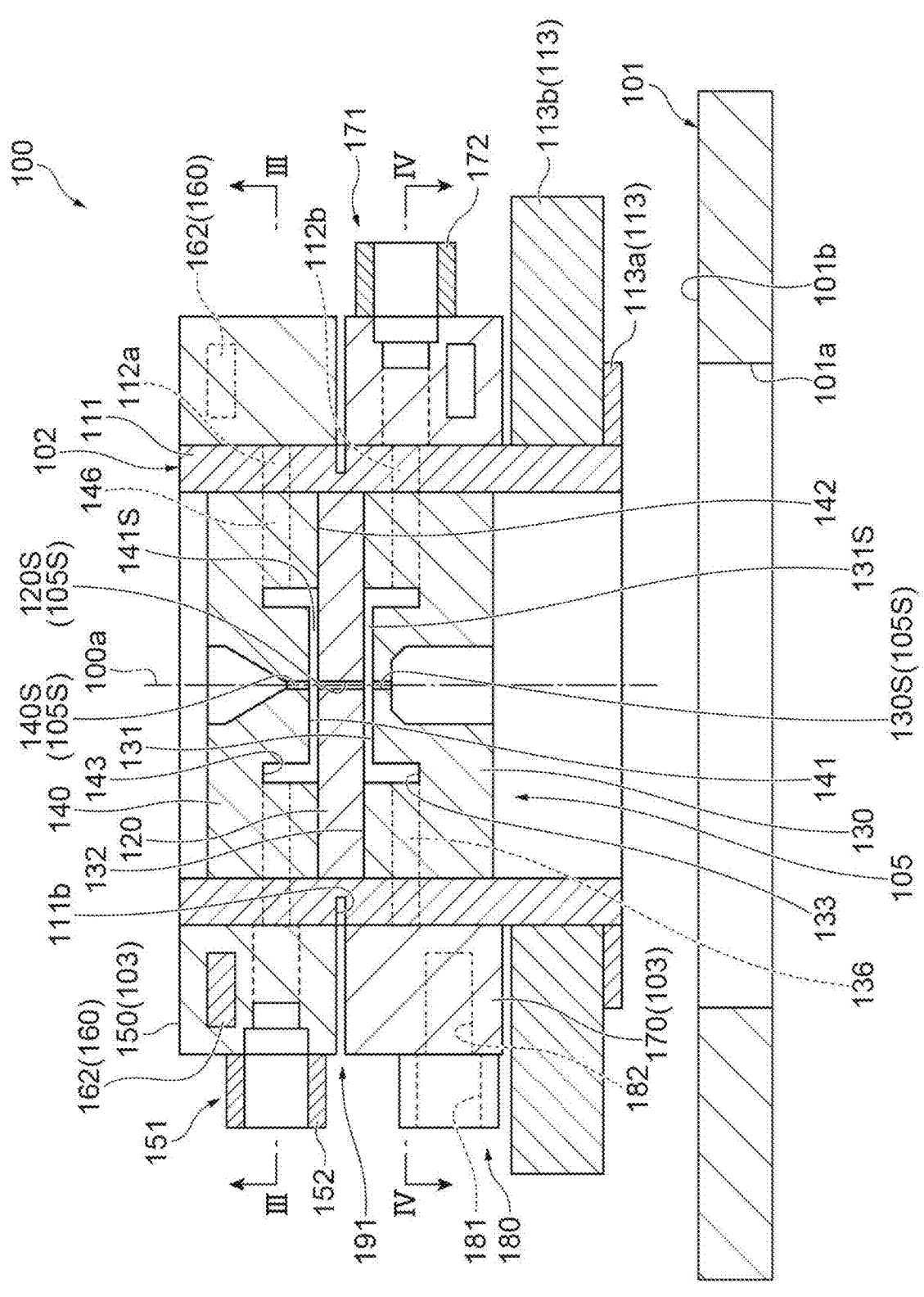
FIG. 2 is a schematic cross-sectional view showing a longitudinal cross-section of a resin coating device according to an example.
Figure 3:
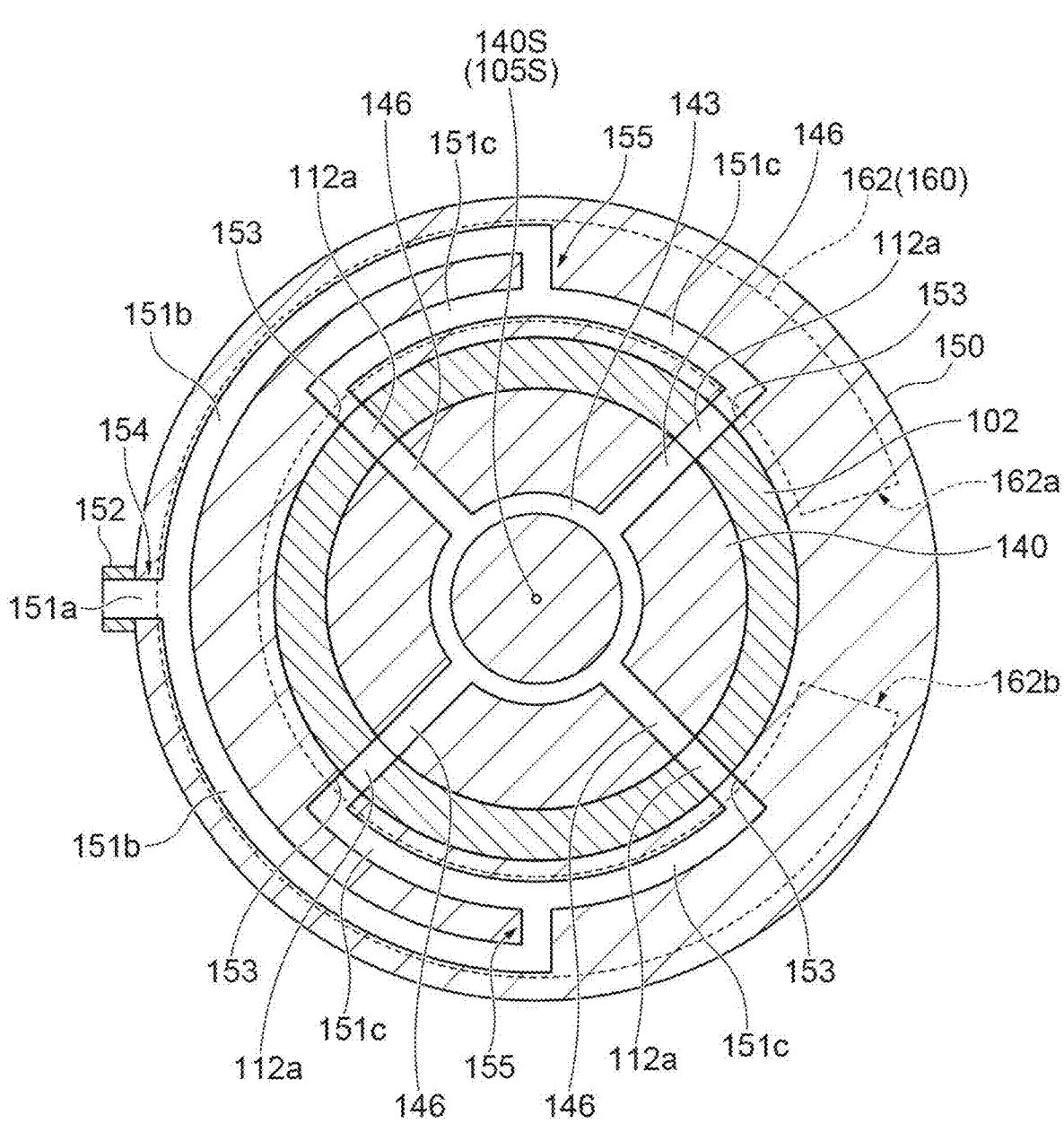
FIG. 3 is a schematic cross-sectional view taken along the line III-III of FIG. 2.
Figure 4:
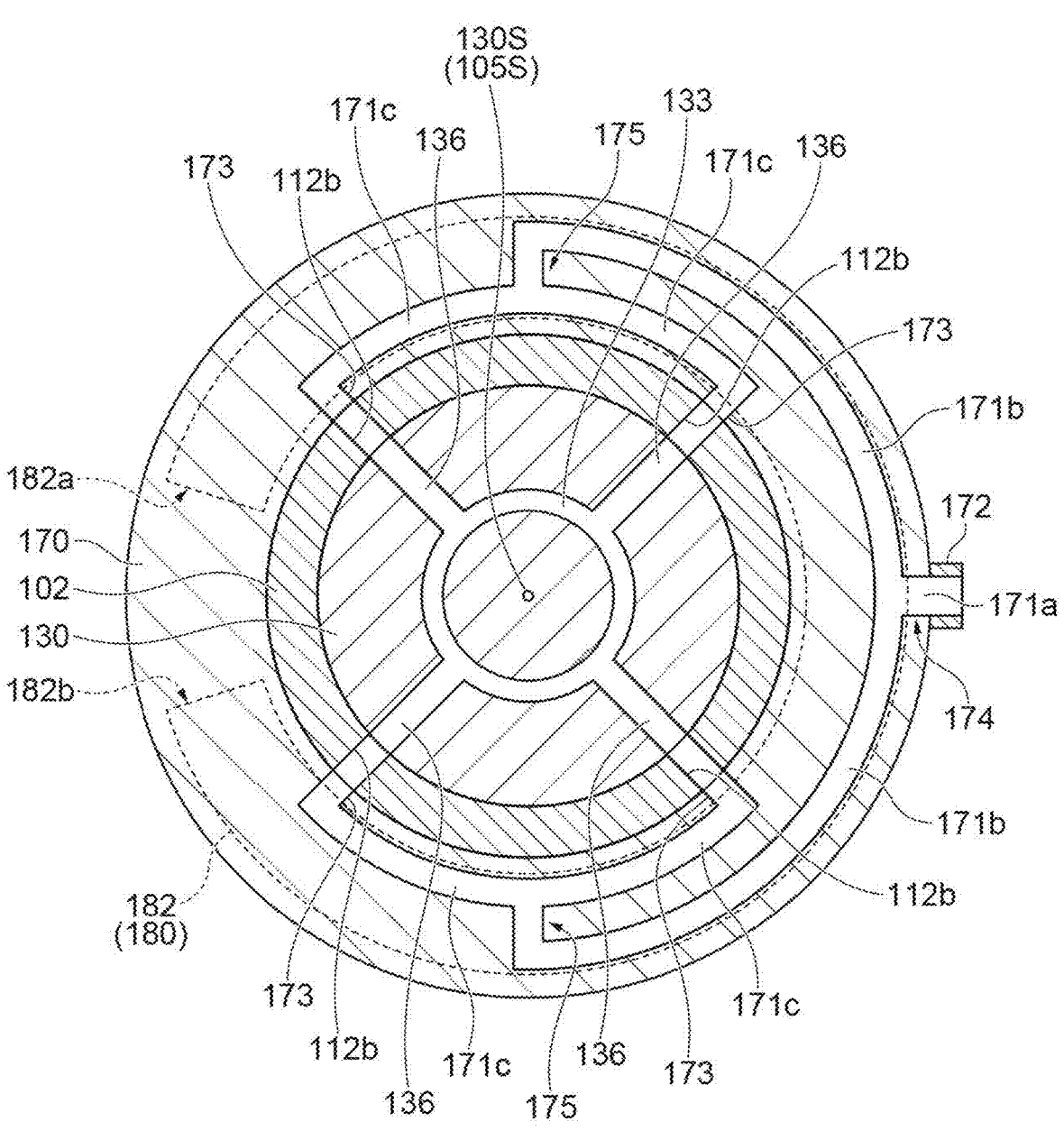
FIG. 4 is a schematic cross-sectional view taken along the line IV-IV of FIG. 2.

Next, the resin coating device 100 will be described in more detail. The resin coating device 100 as an example sequentially coats the glass fiber with two kinds of resins 14 and 15 while two kinds of resins 14 and 15 are controlled at different temperatures. FIG. 2 is a schematic cross-sectional view showing a longitudinal cross-section of the resin coating device 100 as an example. FIG. 3 is a schematic cross-sectional view taken along the line III-III of FIG. 2. FIG. 4 is a schematic cross-sectional view taken along the line IV-IV of FIG. 2.

As shown in FIG. 2, the resin coating device 100 as an example is fixed to a stage 101 provided at a predetermined height position in the optical fiber manufacturing apparatus 1. The stage 101 has a plate shape formed with the vertical direction as a thickness direction. An opening 101a for setting the resin coating device 100 is formed at the center of the stage 101. As an example, the opening 101a may have a circular shape when viewed from above or below.

The resin coating device 100 includes an inner sleeve 102, an outer sleeve 103, and a die 105. The inner sleeve 102 includes a main body portion 111 and a support piece 113. The main body portion 111 has a cylindrical shape including a center shaft 100a along the vertical direction. When viewed from the axial direction, the outer diameter of the main body portion 111 is smaller than the diameter of the opening 101a of the stage 101. The main body portion 111 is provided with a plurality of first through-holes 112a and a plurality of second through-holes 112b penetrating the side wall.

The first through-holes 112a are formed at the same intervals in the circumferential direction of the main body portion 111 and are formed at the same height position. In the example shown in the drawings, four first through-holes 112a are formed. The second through-holes 112b are formed at the same intervals in the circumferential direction of the main body portion 111 and are formed at the same height position. In the example shown in the drawings, four second through-holes 112b are formed.

The height position in which the second through-hole 112b is formed is separated downward from the height position in which the first through-hole 112a is formed. The outer peripheral surface of the main body portion 111 in the middle of the height position in which the first through-hole 112a is formed and the height position in which the second through-hole 112b is formed is provided with a concave portion 111b which is continuous in the circumferential direction.

The support piece 113 is located at the lower end of the main body portion 111. The support piece 113 includes, for example, a small-diameter portion 113a and a large-diameter portion 113b. The small-diameter portion 113a has a plate shape which extends radially outward from the lower end of the main body portion 111. The outer shape of the small-diameter portion 113a is a circular shape when viewed from above or below. The outer diameter of the small-diameter portion 113a may be substantially the same as the diameter of the opening 101a of the stage 101.

The large-diameter portion 113b is located on the upper side of the small-diameter portion 113a. The large-diameter portion 113b and the small-diameter portion 113a are adjacent to each other. The large-diameter portion 113b and the small-diameter portion 113a may be integrally formed with each other. The large-diameter portion 113b has a plate shape which extends radially outward from the outer peripheral surface of the main body portion 111. The outer shape of the large-diameter portion 113b may be a circular shape when viewed from above or below. The outer diameter of the large-diameter portion 113b is larger than the outer diameter of the small-diameter portion 113a, that is, the diameter of the opening 101a of the stage 101. When the small-diameter portion 113a is fitted to the opening 101a of the stage 101 and the large-diameter portion 113b is placed on the upper surface 101b of the stage 101, the resin coating device 100 is fixed to the stage 101.

The die 105 is disposed in the inner space of the inner sleeve 102. The die 105 includes a first die 120, a second die 130, and a point 140. The first die 120 has a cylindrical shape. The first die 120 shares a shaft (center shaft 100a) with the main body portion 111 of the inner sleeve 102. The size of the outer diameter of the first die 120 may be the same as the size of the inner diameter of the inner sleeve 102. A die hole 120S of the first die 120 having a cylindrical shape forms a part of a fiber passage 105S through which the glass fiber F11 passes. The first die 120 is provided in a range between the height position of the first through-hole 112a and the height position of the second through-hole 112b.

The second die 130 is adjacently disposed below the first die 120. The second die 130 has a cylindrical shape. The second die 130 shares the shaft (center shaft 100a) with the main body portion 111 of the inner sleeve 102. The size of the outer diameter of the second die 130 may be the same as the size of the inner diameter of the inner sleeve 102. The end surface on the side of the first die 120 in the second die 130 includes an inner portion 131 which is on the radial inside and an outer portion 132 which is on the radial outside. A die hole 130S of the second die 130 having a cylindrical shape is located at the center of the inner portion 131. The die hole 130S forms a part of the fiber passage 105S through which the glass fiber F11 passes. The height position of the inner portion 131 is lower than the height position of the outer portion 132. Therefore, the outer portion 132 is in contact with the first die 120 in a state in which the second die 130 is adjacent to the first die 120 and a gap 131S is formed between the inner portion 131 and the first die 120. A substantially cylindrical concave portion is formed on the lower surface of the second die 130. The die hole 130S communicates with this concave portion.

A groove 133 is formed along the outer periphery of the inner portion 131 and the inner periphery of the outer portion 132 between the inner portion 131 and the outer portion 132 in the second die 130. The second die 130 is provided with a plurality of flow paths 136 which communicate with the groove 133. The plurality of flow paths 136 communicate the outer peripheral surface of the second die 130 with the groove 133. The plurality of flow paths 136 are evenly arranged in the circumferential direction when viewed from the axial direction. In the example shown in the drawings, the plurality of flow paths 136 are four flow paths and are respectively connected to the second through-holes 112b while the second die 130 is disposed in the inner sleeve 102. The plurality of flow paths 136 extend horizontally along the radial direction of the second die 130.

The point 140 is disposed adjacently on the upper side of the first die 120. The point 140 has a cylindrical shape. The point 140 shares the shaft (center shaft 100a) with the main body portion 111 of the inner sleeve 102. The size of the outer diameter of the point 140 may be the same as the size of the inner diameter of the inner sleeve 102. The end surface on the side of the first die 120 in the point 140 includes an inner portion 141 on the radial inside and an outer portion 142 on the radial outside. A point hole 140S of the point 140 having a cylindrical shape is located at the center of the inner portion 141. The point hole 140S forms a part of the fiber passage 105S through which the glass fiber F11 passes. In the example shown in the drawings, the fiber passage 105S through which the glass fiber F11 passes downward in the vertical direction is formed by the point hole 140S of the point 140, the die hole 120S of the first die 120, and the die hole 130S of the second die 130. The fiber passage 105S extends along the vertical direction about the center shaft 100a.

The height position of the inner portion 141 at the point 140 is higher than the height position of the outer portion 142. Therefore, the outer portion 142 is in contact with the first die 120 while the point 140 is adjacent to the first die 120 so that a gap 141S is formed between the inner portion 141 and the first die 120. The upper surface of the point 140 is provided with a substantially conical concave portion. The point hole 140S communicates with this concave portion.

A groove 143 is formed along the outer periphery of the inner portion 141 and the inner periphery of the outer portion 142 between the inner portion 141 and the outer portion 142 at the point 140. The point 140 is provided with a plurality of flow paths 146 which communicate with the groove 143. The plurality of flow paths 146 communicate the outer peripheral surface of the point 140 with the groove 143. The plurality of flow paths 146 are evenly arranged in the circumferential direction when viewed from the axial direction. In the example shown in the drawings, the plurality of flow paths 146 are four flow paths and are respectively connected to the first through-holes 112a while the point 140 is disposed in the inner sleeve 102. The plurality of flow paths 146 extend horizontally along the radial direction of the point 140.

The outer sleeve 103 is fixed to the outer peripheral surface of the inner sleeve 102. The outer sleeve 103 includes a first annular body 150 and a second annular body 170. The first annular body 150 has an annular shape disposed around the fiber passage 105S (the center shaft 100a). In an example, the first annular body 150 has a cylindrical shape having an inner diameter of the same size as the outer diameter of the inner sleeve 102. The first annular body 150 includes a first flow path 151 and a first temperature controller 160.

The first flow path 151 allows the primary resin 14 to flow toward the fiber passage 105S. The first flow path 151 includes a supply port 152 to which the primary resin 14 is supplied and a discharge port 153 which is connected to the first through-hole 112a of the inner sleeve 102. The primary resin 14 supplied from the supply port 152 is discharged from the discharge port 153 to be supplied to the first through-hole 112a. The primary resin 14 supplied to the first through-hole 112a reaches the fiber passage 105S through the flow path 146 of the point 140, the groove 143, and the gap 141S.

The first flow path 151 includes a branch path which horizontally divides the primary resin 14 moving in the horizontal direction. The first flow path 151 extends in the horizontal direction inside the first annular body 150. The first flow path 151 is divided into a plurality of flow paths by the branch path to correspond to the number of the first through-holes 112a formed in the inner sleeve 102. Additionally, the first flow path 151 may not strictly follow the horizontal direction and may substantially follow the horizontal direction. For example, the first flow path 151 may be formed at an angle of about −3° to 3° with respect to the horizontal direction.

The first flow path 151 of the example shown in the drawings includes an upstream branch path 154 (an upstream first branch path) and a downstream branch path 155 (a downstream first branch path). The upstream branch path 154 divides a flow path 151a continuing from the supply port 152 into a plurality of parts. The downstream branch path 155 further divides each of a plurality of flow paths 151b divided by the upstream branch path 154 into a plurality of parts. In the example shown in the drawings, the upstream branch path 154 and the downstream branch path 155 both include one inlet and two outlets. That is, the upstream branch path 154 and the downstream branch path 155 divide the flow path into two parts.

As shown in FIG. 3, the flow path 151a connected to the supply port 152 is divided into two flow paths 151b by the upstream branch path 154. The two branching flow paths 151b respectively extend in the opposite directions along the circumferential direction. Two flow paths 151b have the same lengths. Each branching flow path 151b is connected to the downstream branch path 155. The downstream branch paths 155 face each other with the fiber passage 105S interposed therebetween. The downstream branch path 155 divides the flow path 151b along the circumferential direction. That is, the downstream branch path 155 extends radially inward from the end portion of the flow path 151b, branches at that position, and is connected to two flow paths 151c extending in the opposite directions along the circumferential direction. Two flow paths 151c have the same lengths. Four flow paths 151c which are divided by the pair of downstream branch paths 155 facing each other extend in the circumferential direction so that the positions of the ends are evenly arranged in the circumferential direction.

Four flow paths 151c are respectively connected to four first through-holes 112a through the discharge port 153.

The cross-sectional area of the inlet of the branch path is the same as the sum of the cross-sectional areas of the plurality of outlets. That is, in the example shown in the drawings, the cross-sectional area of each of two flow paths 151b (outlets) connected to the upstream branch path 154 may be a half of the cross-sectional area of the flow path 151a (inlet) connected to the upstream branch path 154. Similarly, the cross-sectional area of each of two flow paths 151c (outlets) connected to the downstream branch path 155 may be a half of the cross-sectional area of the flow path 151b (inlet) connected to the downstream branch path 155. Additionally, the cross-sectional area of the inlet of the branch path may be substantially the same as the sum of the cross-sectional areas of the plurality of outlets and for example, an error of 10% or less is allowed. Similarly, the cross-sectional areas of the plurality of outlets may be substantially the same and for example, an error of 10% or less is allowed.

The first temperature controller 160 is disposed along the first flow path 151 and controls the temperature of the primary resin 14 flowing through the first flow path 151. In an example, the heat source of the first temperature controller 160 may be a heat generator 162 disposed along the first flow path 151. The heat generator 162 may include, for example, a resistor that generates heat by an externally supplied electric power. The heat generator 162 is horizontally disposed at a height position shifted in any of the vertical direction with respect to the first flow path 151. In the example shown in the drawings, the heat generator 162 is disposed above the first flow path 151. Further, for example, the end portions 162a and 162b of the heat generator 162 are located at positions on the side opposite to the supply port 152 with the fiber passage 105S as the center when viewed from above or below. The heat generator 162 extends in the circumferential direction from the end portion 162a to the end portion 162b. In the radial direction, the heat generator 162 extends from the inner edge of the flow path 151c to the outer edge of the flow path 151b. Further, in the circumferential direction, the heat generator 162 extends in the range in which at least the flow paths 151b and 151c are formed. Accordingly, the positions of the flow path 151b and the flow path 151c overlap the position of the heat generator 162 when viewed from above or below.

The second annular body 170 has an annular shape disposed around the fiber passage 105S. In an example, the second annular body 170 has a cylindrical shape having an inner diameter which is the same size as that of the outer diameter of the inner sleeve 102. The second annular body 170 includes a second flow path 171 and a second temperature controller 180.

The second flow path 171 allows the secondary resin 15 to flow toward the fiber passage 105S. The second flow path 171 includes a supply port 172 to which the secondary resin 15 is supplied and a discharge port 173 which is connected to the second through-hole 112b of the inner sleeve 102. The secondary resin 15 supplied from the supply port 172 is discharged from the discharge port 173 to be supplied to the second through-hole 112b. The secondary resin 15 supplied to the second through-hole 112b reaches the fiber passage 105S through the flow path 136, the groove 133, and the gap 131S of the second die 130.

The second flow path 171 includes a branch path which horizontally divides the secondary resin 15 moving in the horizontal direction. The second flow path 171 as an example extends in the horizontal direction inside the second annular body 170. The second flow path 171 is divided into a plurality of flow paths by a branch path to correspond to the number of the second through-holes 112b formed in the inner sleeve 102. Additionally, the second flow path 171 may not strictly follow the horizontal direction and may substantially follow the horizontal direction. For example, the second flow path 171 may be formed at an angle of about −3° to 3° with respect to the horizontal direction.

The second flow path 171 of the example shown in the drawings includes an upstream branch path 174 (a second branch path on the upstream side) and a downstream branch path 175 (a second branch path on the downstream side). The upstream branch path 174 divides a flow path 171a continuing from the supply port 172 into a plurality of parts.

The downstream branch path 175 further divides each of the plurality of flow paths 171b divided by the upstream branch path 174 into a plurality of parts. In the example shown in the drawings, the upstream branch path 174 and the downstream branch path 175 both include one inlet and two outlets. That is, the upstream branch path 174 and the downstream branch path 175 divide the flow path into two parts.

As shown in FIG. 4, the flow path 171a connected to the supply port 172 is divided into two flow paths 171b by the upstream branch path 174. The divided flow paths 171b respectively extend in the opposite directions along the circumferential direction. Two divided flow paths 171b are respectively connected to the downstream branch paths 175. Two flow paths 171b have the same lengths. The downstream branch paths 175 face each other with the fiber passage 105S interposed therebetween. The downstream branch path 175 divides the flow path 171b along the circumferential direction. That is, the downstream branch path 175 extends radially inward from the end portion of the flow path 171b, branches at that position, and is connected to two flow paths 171c extending in the opposite directions along the circumferential direction. Two flow paths 171c have the same lengths. Four flow paths 171c divided by the pair of downstream branch paths 175 extend in the circumferential direction so that the positions of the ends are evenly arranged in the circumferential direction. Four flow paths 171c are respectively connected to four second through-holes 112b through the discharge port 173.

The cross-sectional area of the inlet of the branch path is the same as the sum of the cross-sectional areas of the plurality of outlets. That is, in the example shown in the drawings, the cross-sectional area may be a half of the cross-sectional area of the flow path 171a (the inlet) connected to the upstream branch path 174. Similarly, the cross-sectional area of each of two flow paths 171c (outlets) connected to the downstream branch path 175 may be a half of the cross-sectional area of the flow path 171b (inlet) connected to the downstream branch path 175.

The second temperature controller 180 is disposed along the second flow path 171 and controls the temperature of the secondary resin flowing through the second flow path 171. In an example, the heat source of the second temperature controller 180 may be a flow path (hereinafter, a temperature control flow path) through which a temperature controlled fluid flows. The fluid may be temperature controlled water (hereinafter, warm water). The second temperature controller 180 is disposed along the second flow path 171.

A temperature control flow path 182 (third flow path) is horizontally disposed at a height position shifted in any of the vertical direction with respect to the second flow path 171. In the example shown in the drawings, the temperature control flow path 182 is disposed below the second flow path 171. Therefore, the first flow path 151 and the second flow path 171 are located between the first temperature controller 160 and the second temperature controller 180 in the vertical direction.

End portions 182a and 182b of the temperature control flow path 182 are located at positions on the side opposite to the supply port 172 with the fiber passage 105S as the center. The temperature control flow path 182 extends from the end portion 182a to the end portion 182b along the circumferential direction. The warm water flowing through the temperature control flow path 182 is supplied from, for example, the end portion 182a and is discharged from the end portion 182b. The end portion 182a and the end portion 182b are separately provided with a connection end 181 which supplies or discharges the warm water. The warm water discharged from the end portion 182b may be subjected to the temperature control again and may be supplied to the end portion 182a. In the radial direction, the temperature control flow path 182 extends from the inner edge of the flow path 171c to the outer edge of the flow path 171b. Further, in the circumferential direction, the temperature control flow path 182 extends in the range in which at least the flow paths 171b and 171c are formed. Accordingly, the positions of the flow path 171b and the flow path 171c overlap the position of the temperature control flow path 182 when viewed from above or below.

In the vertical direction, a heat shield layer 191 is formed between the first annular body 150 and the second annular body 170. In the example shown in the drawings, the first annular body 150 and the second annular body 170 are separated from each other in the vertical direction. That is, an air layer which functions as the heat shield layer 191 is formed between the first annular body 150 and the second annular body 170. Additionally, in an example, the air layer is formed along the position of the concave portion 111b formed on the outer peripheral surface of the inner sleeve 102.

Next, a method of manufacturing an optical fiber of the optical fiber manufacturing apparatus 1 will be described. In the optical fiber manufacturing apparatus 1, the preform 10 which is a base material is first set in the drawing furnace 11. Then, the preform 10 is melted by the heater. The melted preform 10 is drawn to form the glass fiber F11. The glass fiber F11 moves downward along the vertical direction and passes through the forced cooling device 12. In the forced cooling device 12, the drawn glass fiber F11 is cooled.

The cooled glass fiber F11 passes through the outer diameter measuring device 13 and the outer diameter of the glass fiber F11 is measured. The glass fiber F11 of which the outer diameter is measured moves downward along the vertical direction and passes through the resin coating device 100.

In the resin coating device 100, the primary resin 14 is supplied to the first flow path 151 at a predetermined flow rate and the secondary resin 15 is supplied to the second flow path 171 at a predetermined flow rate. The primary resin 14 supplied to the first flow path 151 is controlled to a predetermined first temperature by the first temperature controller 160 and the secondary resin 15 supplied to the second flow path 171 is controlled to a predetermined second temperature by the second temperature controller 180. The temperature controlled by the first temperature controller 160 and the temperature controlled by the second temperature controller 180 are different from each other.

In the resin coating device 100, the temperature of the resin is controlled so that the viscosity of the resin enters a predetermined range. In general, the viscosity (Pa·s) of the resin depends on the temperature, becomes low as the temperature becomes high, and becomes high as the temperature becomes low. In the optical fiber manufacturing apparatus 1, the peripheral surface of the glass fiber F11 can be appropriately coated with a resin by adjusting the viscosity of the resin to a predetermined range. In an example, the primary resin 14 needs to be flexible in order to come into contact with the glass fiber F11 and absorb external strain and tends to have a high viscosity. Further, the secondary resin 15 is required to have hardness and toughness in order to withstand external stress and tends to have a low viscosity. That is, the viscosity of the primary resin 14 is higher than the viscosity of the secondary resin 15 at the same temperature condition. In this case, in order to adjust the viscosities of the primary resin 14 and the secondary resin 15 in the range suitable for the coating, the temperature of the primary resin 14 needs to be controlled to a temperature higher than the temperature of the secondary resin 15. Therefore, in the resin coating device 100 as an example, the first temperature is set to be higher than the second temperature.

In the resin coating device 100 as an example, the viscosities of the primary resin 14 and the secondary resin 15 when used for coating the glass fiber F11 are adjusted from about 0.8 Pa·s to 2.0 Pa·s. As an example, when the first temperature controlled by the first temperature controller 160 is from about 35° C. to 70° C. and the second temperature controlled by the second temperature controller 180 is from 30° C. to 45° C., the primary resin 14 and the secondary resin 15 can satisfy the above viscosities. Additionally, in this case, the viscosity ratio (the viscosity of the secondary resin/the viscosity of the primary resin) between the primary resin 14 and the secondary resin 15 may be, for example, about 0.5 to 0.9.

The primary resin 14 subjected to the temperature control flows into the fiber passage 105S through the first flow path 151, the first through-hole 112a, the flow path 146, the groove 143, and the gap 141S. The primary resin 14 flows from the plurality of flow paths 146 evenly arranged in the circumferential direction into the groove 143 and the gap 141S surrounding the fiber passage 105S over the entire region in the circumferential direction. Accordingly, the flow of the primary resin 14 in the vicinity of the fiber passage 105S becomes uniform in the circumferential direction. Similarly, the secondary resin 15 flows into the fiber passage 105S through the second flow path 171, the second through-hole 112b, the flow path 136, the groove 133, and the gap 131S.

The secondary resin flows from the flow paths 136 evenly arranged in the circumferential direction into the groove 133 and the gap 131S surrounding the fiber passage 105S over the entire area in the circumferential direction. Accordingly, the flow of the secondary resin 15 in the vicinity of the fiber passage 105S becomes uniform in the circumferential direction.

When the glass fiber F11 moving downward in the vertical direction passes through the fiber passage 105S, the peripheral surface of the glass fiber F11 is first coated with the primary resin 14. Then, as the glass fiber F11 moves downward, the secondary resin 15 is further coated on the primary resin 14 coated on the glass fiber F11.

Next, the uneven thickness measuring device 16 measures the deviation of the center position of the glass fiber F11 with respect to the center position of the optical fiber F. Then, the glass fiber F11 coated with the resins 14 and 15 moves downward along the vertical direction and passes through the UV furnace 17. When the glass fiber F11 passes through the UV furnace 17, the resins 14 and 15 are irradiated with ultraviolet rays to form the optical fiber F. The optical fiber F moves along a predetermined direction via the guide roller 20, is taken up by the capstan 21, and is sent to the winding bobbin 22.

In the resin coating device 100 of the above-described optical fiber manufacturing apparatus 1, the upstream branch path 154, the downstream branch path 155 (first branch path), the upstream branch path 174, and the downstream branch path 175 (second branch path) which horizontally divides a resin are respectively formed in the first flow path 151 and the second flow path 171. Therefore, it is possible to form a flow path from a plurality of positions in the circumferential direction toward the fiber passage 105S. Thus, the flow of the resin used for coating the glass fiber F11 can be adjusted to be uniform in the circumferential direction of the glass fiber F11. Further, since the flow path including each branch path branches only in the horizontal direction, it is possible to decrease the size of the resin coating device 100 in the vertical direction. Accordingly, an increase in the height of the entire optical fiber manufacturing apparatus 1 is suppressed.

The first flow path 151 and the first temperature controller 160 as an example are formed in the first annular body 150 which is disposed around the fiber passage 105S and has an annular shape. Further, the second flow path 171 and the second temperature controller 180 are formed in the second annular body 170 which is formed around the fiber passage 105S, disposed below the first annular body 150, and has an annular shape. In this configuration, the flow paths 151 and 171 and the temperature controllers 160 and 180 are likely to be evenly arranged around the fiber passage 105S.

In an example, the heat shield layer 191 is formed between the first annular body 150 and the second annular body 170 in the vertical direction. In this configuration, the influence of the first temperature controller 160 formed in the first annular body 150 on the second annular body 170 is suppressed. Further, the influence of the second temperature controller 180 formed in the second annular body 170 on the first annular body 150 is suppressed.

Further, the first flow path 151 and the second flow path 171 are located between the first temperature controller 160 and the second temperature controller 180 in the vertical direction, the temperature of the first flow path 151 is controlled by the first temperature controller 160, and the temperature of the second flow path 171 is controlled by the second temperature controller 180. In this configuration, the influence of the first temperature controller 160 formed in the first annular body 150 on the second annular body 170 is suppressed. Further, the influence of the second temperature controller 180 formed in the second annular body 170 on the first annular body 150 is suppressed.

In the first temperature controller 160 as an example, the heat generator 162 disposed along the first flow path 151 is used as a heat source. Further, in the second temperature controller 180, the temperature control flow path 182 disposed along the second flow path 171 and allowing the temperature controlled fluid to flow therethrough is used as a heat source. In this configuration, for example, the temperature of the primary resin 14 flowing through the first flow path 151 can be easily controlled to a temperature higher than that of the secondary resin 15.

The upstream branch path 154 includes the flow path 151a as an inlet and includes two flow paths 151b as outlets. The flow path cross-sectional area of one flow path 151b is a half of the flow path cross-sectional area of the flow path 151a. Further, the downstream branch path 155 includes the flow path 151b as an inlet and includes two flow paths 151c as outlets. The flow path cross-sectional area of one flow path 151c is a half of the flow path cross-sectional area of the flow path 151b. Further, the cross-sectional area of the inlet of each branch path is the same as the sum of the cross-sectional areas of the outlets. In this configuration, the primary resin 14 can be evenly divided by each branch path. Additionally, the above action is also the same as those of the upstream branch path 174 and the downstream branch path 175.

The first flow path 151 includes the flow path 151c which is four outlets divided by the upstream branch path 154 and the downstream branch path 155. Four flow paths 151c are evenly arranged in the circumferential direction about the fiber passage 105S. With this configuration, the flow of the primary resin 14 in the vicinity of the fiber passage 105S is likely to be uniform in the circumferential direction.

The upstream branch path 174 includes the flow path 171a as the inlet and includes two flow paths 171b as the outlet. The flow path cross-sectional area of one flow path 171b is a half of the flow path cross-sectional area of the flow path 171a. Further, the downstream branch path 175 includes the flow path 171b as an inlet and includes two flow paths 171c as outlets. The flow path cross-sectional area of one flow path 171c is a half of the flow path cross-sectional area of the flow path 171b. Further, the cross-sectional area of the inlet of each branch path is the same as the sum of the cross-sectional areas of the outlets. In this configuration, the secondary resin 15 can be evenly divided by each branch path.

The second flow path 171 includes the flow paths 171c which are four outlets divided by the upstream branch path 174 and the downstream branch path 175. Four flow paths 171c are evenly arranged in the circumferential direction around the fiber passage 105S. With this configuration, the flow of the secondary resin 15 in the vicinity of the fiber passage 105S is likely to be uniform in the circumferential direction.

The present disclosure is not limited to the above-described embodiment, and can be appropriately modified without departing from the spirit described in the claims.

For example, an example is shown in which the heat shield layer 191 is formed by air, but the heat shield layer 191 may be formed by a heat insulation material or the like.

Further, an example is shown in which the heat source of the first temperature controller 160 is the heat generator 162 disposed along the first flow path 151, but the heat source of the first temperature controller 160 may be a flow path disposed along the first flow path 151 instead of the heat generator 162. The flow path may have the same configuration as that of the temperature control flow path 182 and hot water managed to a temperature different from that of the hot water supplied to the temperature control flow path 182 may be supplied. Further, the heat source of the second temperature controller 180 may be the same heat generator as that of the heat generator 162 instead of the temperature control flow path 182.

An example is shown in which the flow path is divided into two parts in the upstream branch paths 154 and 174 and the downstream branch paths 155 and 175, but the configuration of each branch path is not limited thereto. For example, the branch path may include three or more outlets for one inlet. Further, the flow paths 151 and 171 may include only the upstream flow path. Also in this case, the branch path may include three or more outlets for one inlet.

What is claimed is:

1. A coating device comprising:

a fiber passage through which a glass fiber passes downward in a vertical direction;

an inner sleeve, an outer sleeve, and a die having a first die and a second die;

said die is disposed in the inner space of the inner sleeve; the first die shares a shaft with a main body portion of the inner sleeve;

the second die shares the shaft with the main body portion of the inner sleeve;

a concave portion is formed on the outer peripheral surface of the inner sleeve and between a first annular body and a second annular body;

the outer sleeve is fixed to an outer peripheral surface of the inner sleeve; the outer sleeve includes the first annular body and the second annular body; the first annular body has an inner diameter of a same size as the outer diameter of the inner sleeve;

the second annular body has an inner diameter of a same size as the outer diameter of the inner sleeve;

a first flow path which is a flow path allowing a primary resin to flow toward the fiber passage and includes a first branch path only horizontally dividing the primary resin moving in a horizontal direction;

a first temperature controller which is disposed along the first flow path and controls a temperature of the first flow path;

a second flow path which is a flow path allowing a secondary resin to flow toward the fiber passage, includes a second branch path only horizontally dividing the secondary resin moving in the horizontal direction, and is located below the first flow path; and a second temperature controller which is disposed along the second flow path and controls a temperature of the second flow path, wherein each of the first flow path and the second flow path is formed into four-branch flow paths by being branched into two twice, and each flow path of the four-branch flow paths is arranged with respect to each other at an interval of 90° in a circumferential direction, the first flow path and the first temperature controller form the first annular body disposed around the fiber passage and having an annular shape, the second flow path and the second temperature controller form the second annular body disposed around the fiber passage, disposed below the first annular body, and having an annular shape, the first annular body and the second annular body are separated from each other in the vertical direction and a heat shield layer formed by an air layer or a heat insulation material is formed between the first annular body and the second annular body, said heat shield layer is formed along a position of the concave portion formed on the outer peripheral surface of the inner sleeve;

and the temperature of the first flow path controlled by the first temperature controller is higher than the temperature of the second flow path controlled by the second temperature controller.

2. The coating device according to claim 1, wherein the first flow path and the second flow path are located between the first temperature controller and the second temperature controller in the vertical direction, the temperature of the first flow path is controlled by the first temperature controller, and the temperature of the second flow path is controlled by the second temperature controller.

3. The coating device according to claim 1, wherein a heat source of the first temperature controller is a heat generator disposed along the first flow path, and wherein a heat source of the second temperature controller is a third flow path which is disposed along the second flow path and through which a fluid having a controlled temperature flows.

4. The coating device according to claim 1, wherein the first branch path includes one inlet and two outlets and a cross-sectional area of each of the two outlets is a half of a cross-sectional area of the one inlet.

5. The coating device according to claim 1, wherein the first branch path includes one inlet and a plurality of outlets and a cross-sectional area of the one inlet is equal to the sum of cross-sectional areas of the plurality of outlets.

6. The coating device according to claim 1, wherein the first flow path includes four outlets divided by the first branch path, and wherein the four outlets are evenly arranged around the fiber passage in a circumferential direction.

7. The coating device according to claim 1, wherein the second branch path includes one inlet and two outlets and a cross-sectional area of each of the two outlets is a half of a cross-sectional area of the one inlet.

8. The coating device according to claim 1, wherein the second branch path includes one inlet and a plurality of outlets and a cross-sectional area of the one inlet is equal to the sum of cross-sectional areas of the plurality of outlets.

9. The coating device according to claim 1, wherein the second flow path includes four outlets divided by the second branch path, and wherein the four outlets are evenly arranged in a circumferential direction around the fiber passage.

* * * * *